United States Patent
Yuan et al.

(10) Patent No.: US 10,714,973 B2
(45) Date of Patent: Jul. 14, 2020

(54) UNINTERRUPTIBLE POWER OPERATING APPARATUS

(71) Applicant: DELTA ELECTRONICS, INC., Taoyuan (TW)

(72) Inventors: Te-Wei Yuan, Taoyuan (TW); Yi-Jan Chang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 195 days.

(21) Appl. No.: 16/054,039

(22) Filed: Aug. 3, 2018

(65) Prior Publication Data

US 2019/0097456 A1    Mar. 28, 2019

Related U.S. Application Data

(60) Provisional application No. 62/563,802, filed on Sep. 27, 2017.

(30) Foreign Application Priority Data

Jun. 15, 2018    (TW) .............................. 107120850 A (51) Int. Cl.
     *H02J 9/06*      (2006.01)
     *H02J 7/02*      (2016.01)
     *H02M 3/335*      (2006.01)
     *H02M 1/10*      (2006.01)

(52) U.S. Cl.
     CPC ............. *H02J 9/062* (2013.01); *H02J 7/022* (2013.01); *H02J 9/061* (2013.01); *H02M 1/10* (2013.01); *H02M 3/335* (2013.01)

(58) Field of Classification Search
     CPC ............ H02J 9/061; H02J 9/062; H02J 7/022; H02M 1/10; H02M 3/335

USPC .......................................................... 307/64
See application file for complete search history.

(56) References Cited

U.S. PATENT DOCUMENTS 5,994,794 A      11/1999    Wehrlen

FOREIGN PATENT DOCUMENTS

| CN | 2590241 Y | 12/2003 |
|---|---|---|
| CN | 101752880 B | 8/2012 |
| CN | 203278632 U | 11/2013 |
| JP | S648836 A | 1/1989 |
| JP | H10191579 A | 7/1998 |

(Continued)

*Primary Examiner* — Hal Kaplan
(74) *Attorney, Agent, or Firm* — Kirton McConkie; Evan R. Witt (57) ABSTRACT

An uninterruptible power operating apparatus includes an energy storage element, a charging circuit, a DC/DC converting circuit, a first DC/AC converting circuit, a driving circuit and a switching element. The DC/DC converting circuit is electrically connected with the energy storage element to convert its first DC energy to a second DC energy. The first DC/AC converting circuit is electrically connected with the DC/DC converting circuit. The driving circuit is electrically connected between an AC power source and a load. The switching element is electrically connected between the DC/DC converting circuit and the driving circuit. When the AC power source outputs power normally, the switching element is turned off, and the driving circuit receives energy from AC power source. When the power outputted from the AC power source is interrupted or abnormal, the switching element is turned on, and the driving circuit receives the second DC energy through the switching element.

21 Claims, 6 Drawing Sheets

(56) References Cited

FOREIGN PATENT DOCUMENTS

| | | |
|---|---|---|
| JP | 2004236460 A | 8/2004 |
| JP | 2007124782 A | 5/2007 |
| JP | 2011055644 A | 3/2011 |
| TW | 200841555 A | 10/2008 |
| TW | 201123684 A | 7/2011 |
| TW | M461247 U | 9/2013 |

UNINTERRUPTIBLE POWER OPERATING APPARATUS

CROSS-REFERENCE TO RELATED APPLICATION

This application claims the benefit of U.S. Provisional Application Ser. No. 62/563,802 filed on Sep. 27, 2017, and claims priority to Taiwan Patent Application No. 107120850 filed on Jun. 15, 2018, the entire contents of which are incorporated herein by reference for all purposes.

FIELD OF THE INVENTION

The present disclosure relates to an uninterruptible power operating apparatus, and more particularly to an uninterruptible power operating apparatus having a driving circuit to receive the electric energy discharged from an energy storage element quickly to drive a load when the AC power source is interrupted or abnormal, and having better electric energy conversion efficiency and lower cost.

BACKGROUND OF THE INVENTION

Most of the precise electronic instruments and equipment rely on high quality and stable power to maintain a normal operation. An uninterruptible power operating apparatus not only ensures the reliability of the power supply source, but also offers a high quality power waveform. Consequently, the uninterruptible power operating apparatus provides the best solution which ensures the reliability of power supply and supplies high quality electric power. For example, in case that the uninterruptible power operating apparatus is applied to an elevator, the elevator works stably and continuously when the utility power is interrupted or abnormal. The uninterruptible power operating apparatus ensures the safety of people.

Figure 1:
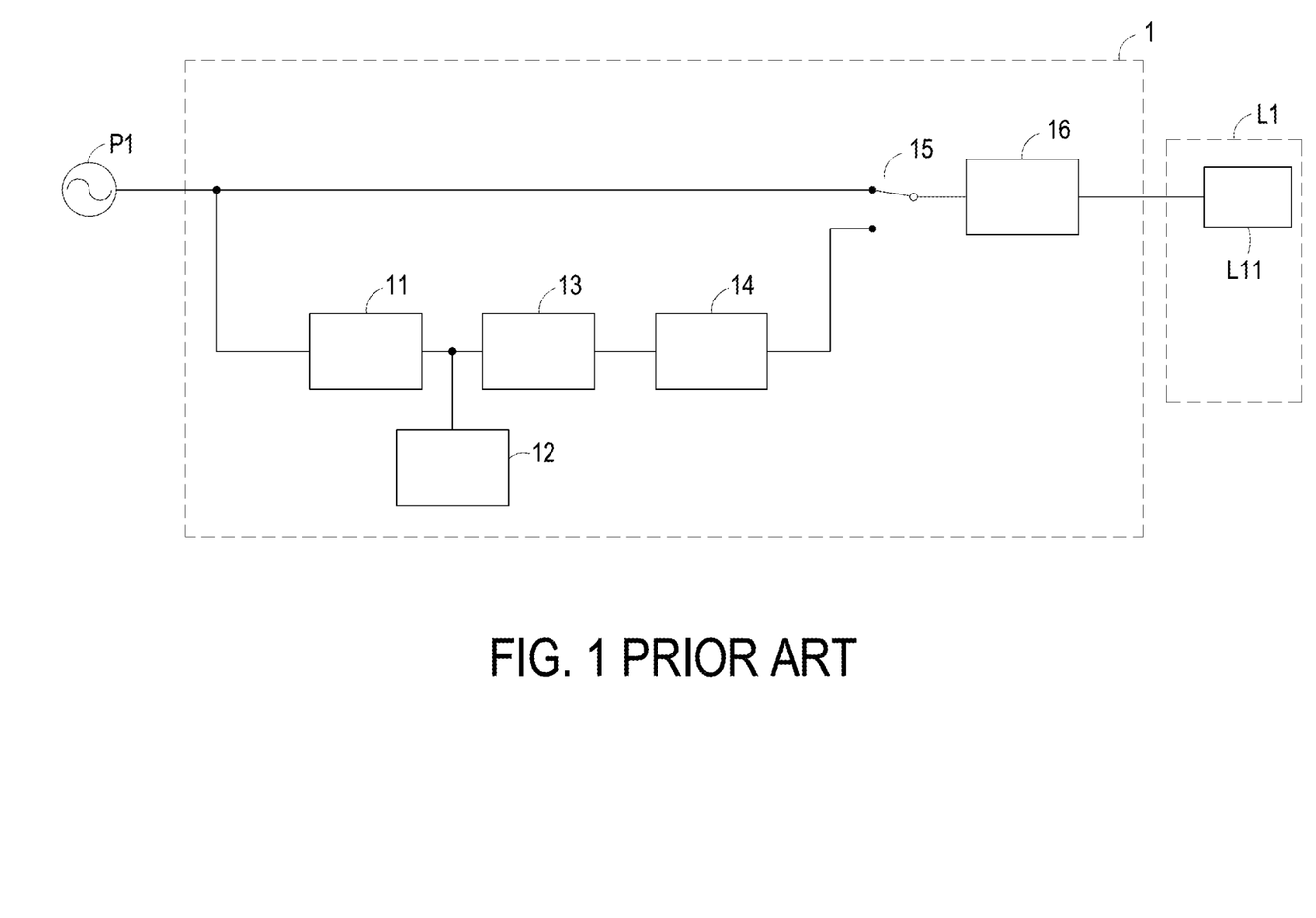
FIG. 1 is a schematic block diagram illustrating an uninterruptible power operating apparatus according to a prior art.

FIG. 1 is a schematic block diagram illustrating an uninterruptible power operating apparatus according to a prior art. As shown in FIG. 1, two ends of the uninterruptible power operating apparatus 1 are electrically connected with a load L1 and an AC power source P1, respectively. The AC power source P1 is, for example, the utility power. The uninterruptible power operating apparatus 1 provides backup power to the load L1 for maintaining the operation of the load L1 when the power outputted from the AC power source P1 is interrupted or abnormal. The load L1 is, for example, an elevator. The uninterruptible power operating apparatus 1 includes a charging circuit 11, an energy storage element such as a rechargeable battery 12, a DC/DC converting circuit 13, a DC/AC converting circuit 14, a triple ends switch element 15 and a driving circuit 16. When the AC power source P1 outputs power normally, the charging circuit 11 converts the electric energy outputted from the AC power source P1 to the backup electric energy to be stored in the rechargeable battery 12. When the power outputted from the AC power source P1 is interrupted or abnormal, the backup electric energy stored in the rechargeable battery 12 is discharged and been converted by the DC/DC converting circuit 13 and the DC/AC converting circuit 14 in sequence. Consequently, an AC electric energy is converted and outputted by the DC/AC converting circuit 14. The triple ends switch element 15 is used to switch the paths according to the power supplying status of the AC power source P1. When the AC power source P1 outputs power normally, the triple ends switch element 15 is switched to be electrically connected between the AC power source P1 and the driving circuit 16 directly. When the power outputted from the AC power source P1 is interrupted or abnormal, the triple ends switch element 15 is switched to be electrically connected between the DC/AC converting circuit 14 and the driving circuit 16. Namely, according to the power supplying status of the AC power source P1, the driving circuit 16 selectively receives the electric energy outputted from the AC power source P1 or the AC electric energy outputted from the DC/AC converting circuit 14 through the triple ends switch element 15 so as to drive a motor L11 within the load L1.

However, when the power outputted from the AC power source P1 is interrupted or abnormal, the driving circuit 16 of the uninterruptible power operating apparatus 1 receives the AC electric energy outputted from the DC/AC converting circuit 14 by switching the triple ends switch element 15. At this stage, time delay occurs during the switching operation of the triple ends switch element 15, which results in that the driving circuit 16 fails to receive the AC electric energy outputted from the DC/AC converting circuit 14 by switching the triple ends switch element 15 immediately when the power outputted from the AC power source P1 is interrupted or abnormal. Under this circumstance, the driving circuit 16 drives the motor L11 within the load L1 by using the residual power energy. Therefore, the motor L11 within the load L1 decreases the efficiency or interrupts the operation at the moment when the power outputted from the AC power source P1 is interrupted or abnormal. Moreover, the backup electric energy stored in the rechargeable battery 12 of the uninterruptible power operating apparatus 1 is discharged and processed by the DC/DC converting circuit 13, the DC/AC converting circuit 14 and the driving circuit 16, and then provided to the motor L11 of the load L1. Hence, the operations of the three stage circuit including the DC/DC converting circuit 13, the DC/AC converting circuit 14 and the driving circuit 16 may cause energy loss during power conversion of the backup electric energy.

Figure 2:
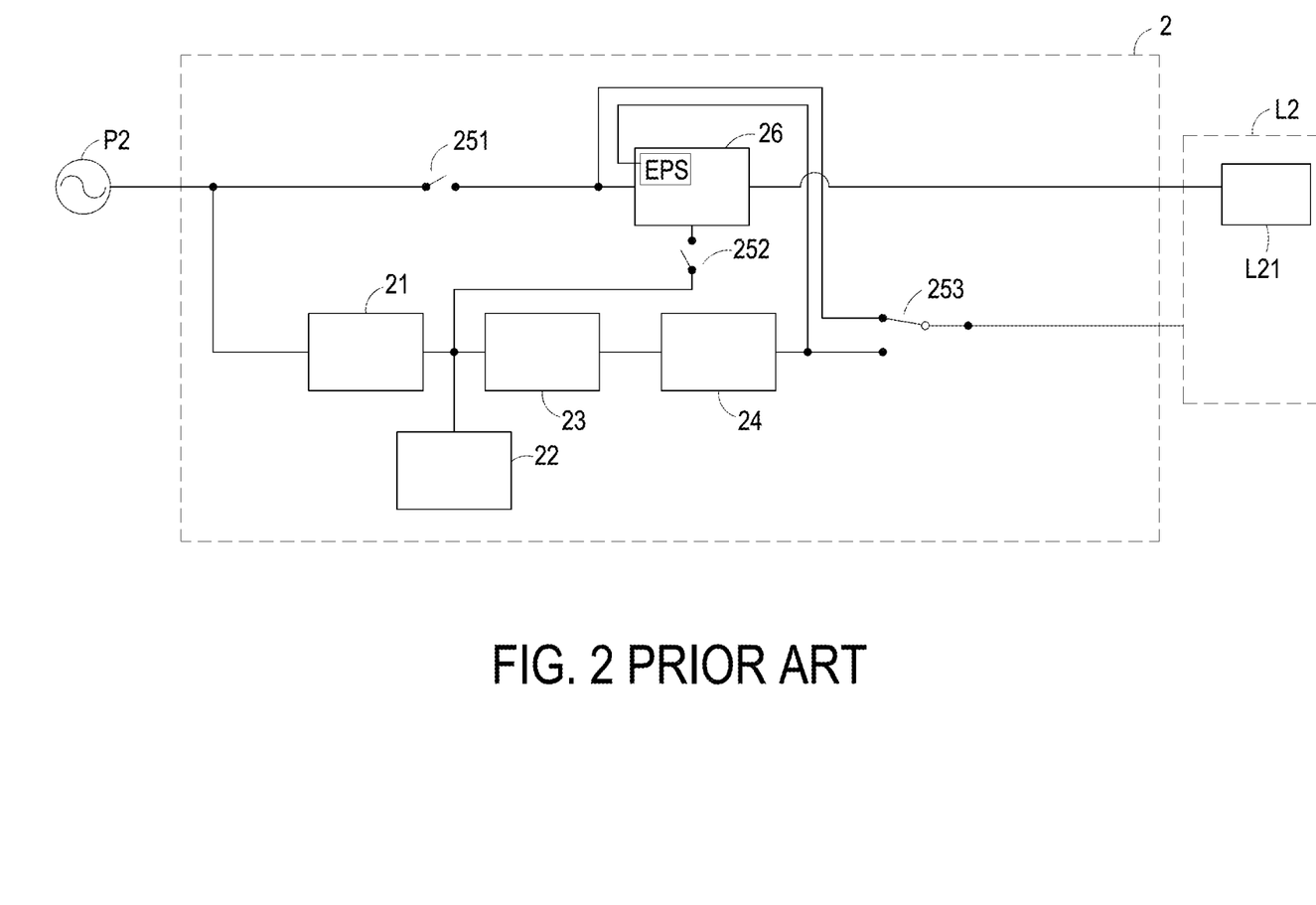
FIG. 2 is a schematic block diagram illustrating an uninterruptible power operating apparatus according to another prior art.

FIG. 2 is a schematic block diagram illustrating an uninterruptible power operating apparatus according to another prior art. As shown in FIG. 2, two ends of the uninterruptible power operating apparatus 2 are electrically connected with a load L2 and an AC power source P2, respectively. The AC power source P2 is, for example, the utility power. The uninterruptible power operating apparatus 2 provides backup power to the load L2 for maintaining the operation of the load L2 when the power outputted from the AC power source P2 is interrupted or abnormal. The load L2 is, for example, an elevator. The uninterruptible power operating apparatus 2 includes a charging circuit 21, an energy storage element such as a rechargeable battery 22, a DC/DC converting circuit 23, a DC/AC converting circuit 24, a first switch element 251, a second switch element 252, a triple ends switch element 253 and a driving circuit 26. When the AC power source P2 outputs power normally, the charging circuit 21 converts the electric energy outputted from the AC power source P2 to the backup electric energy to be stored in the rechargeable battery 22. When the power outputted from the AC power source P2 is interrupted or abnormal, the backup electric energy stored in the rechargeable battery 22 is discharged and converted by the DC/DC converting circuit 23 and the DC/AC converting circuit 24. Consequently, an AC electric energy is converted and outputted by the DC/AC converting circuit 24. The first switch element 251 and the second switch element 252 are turned on or turned off according to the power supplying status of the AC power source P2. When the AC power source P2 outputs power normally, the first switch element 251 is turned on to be electrically connected between the AC power source P2 and the driving circuit 26, and the second switch element 252 is turned off. Under this circumstance, the driving circuit 26 receives the electric energy outputted from the AC power source P2 through the first switch element 251 to drive the motor L21 within the load L2 directly. When the power outputted from the AC power source P2 is interrupted or abnormal, the second switch element 252 is turned on to be electrically connected between the rechargeable battery 22 and the driving circuit 26, and the first switch element 251 is turned off. Meanwhile, the backup electric energy stored in the rechargeable battery 22 is discharged and provided to the driving circuit 26. The voltage of the rechargeable battery 22 is relative low, so that the driving circuit 26 fails to operate or to work effectively by utilizing the low voltage backup electric energy discharged from the rechargeable battery 22. Hence, the driving circuit 26 needs to install an EPS (emergency power supply) port electrically connected with the DC/AC converting circuit 24. The EPS port receives the AC electric energy outputted by the DC/AC converting circuit 24 to drive the driving circuit 26, so that the driving circuit 26 receives and converts the backup electric energy discharged from the rechargeable battery 22 through the second switch element 252 to drive the motor L21 within the load L2. The triple ends switch element 253 includes a triple ends switch and is used to switch the paths according to the power supplying status of the AC power source P2. When the AC power source P2 outputs power normally, the triple ends switch element 253 is switched to be electrically connected between the AC power source P2 and the load L2 through the first switch element 251 turned on. When the power outputted from the AC power source P2 is interrupted or abnormal, the triple ends switch element 253 is switched to be electrically connected between the DC/AC converting circuit 24 and the load L2.

From above descriptions, the driving circuit 26 of the uninterruptible power operating apparatus 2 needs to employ the EPS port additionally. Hence, the uninterruptible power operating apparatus 2 costs higher. Moreover, because the voltage of the rechargeable battery 22 is relative low, the current conveyed through the wire, which is used to transfer the backup electric energy discharged from the rechargeable battery 22 to the driving circuit 26, is relative high. Hence, thicker wires are need, and the uninterruptible power operating apparatus 2 costs higher.

Therefore, there is a need of providing an uninterruptible power operating apparatus to obviate the drawbacks encountered from the prior arts.

SUMMARY OF THE INVENTION

The present disclosure provides an uninterruptible power operating apparatus with a driving circuit to receive the electric energy discharged from an energy storage element rapidly to drive the load when the power outputted from the AC power source is interrupted or abnormal, and thus has higher electric energy conversion efficiency and lower cost.

In accordance with an aspect of the present disclosure, there is provided an uninterruptible power operating apparatus electrically connected between an AC power source and a load. The uninterruptible power operating apparatus receives a first AC electric energy form the AC power source and includes an energy storage element, a charging circuit, a DC/DC converting circuit, a first DC/AC converting circuit, a driving circuit and a switching element. The energy storage element is configured to provide a first DC electric energy. The charging circuit is configured to receive and convert the first AC electric energy to charge the energy storage element when the AC power source outputs power normally. An input end of the DC/DC converting circuit is electrically connected with the energy storage element. The DC/DC converting circuit is configured to convert the first DC electric energy discharged from the energy storage element to a second DC electric energy when the power outputted from the AC power source is interrupted or abnormal. An input end of the first DC/AC converting circuit is electrically connected with an output end of the DC/DC converting circuit. The first DC/AC converting circuit is configured to convert the second DC electric energy to a second AC electric energy. A first connection end of the driving circuit is electrically connected with the AC power source. An output end of the driving circuit is electrically connected with the load. A voltage of a second connection end of the driving circuit is corresponding to a voltage of the first connection end of the driving circuit. A first end of the switching element is electrically connected with an output end of the DC/DC converting circuit. A second end of the switching element is electrically connected with the second connection end of the driving circuit. When the AC power source outputs power normally, the switching element is turned off, the driving circuit receives the first AC electric energy through the first connection end thereof and converts the first AC electric energy to an output electric energy for driving the load. When the power outputted from the AC power source is interrupted or abnormal, the switching element is turned on, the driving circuit receives the second DC electric energy through the second connection end thereof and the second end of the switching element and converts the second DC electric energy to the output electric energy for driving the load.

In accordance with another aspect of the present disclosure, there is provided an uninterruptible power operating apparatus electrically connected between an AC power source and a load. The uninterruptible power operating apparatus receives a first AC electric energy outputted from the AC power source and includes an energy storage element, a charging circuit, a DC/DC converting circuit, a driving circuit, a first DC/AC converting circuit and a switching element. The energy storage element is configured to provide a first DC electric energy. The charging circuit is configured to receive and convert the first AC electric energy to charge the energy storage element when the AC power source outputs power normally. An input end of the DC/DC converting circuit is electrically connected with the energy storage element. The DC/DC converting circuit is configured to convert the first DC electric energy to a second DC electric energy when the power outputted from the AC power source is interrupted or abnormal. The driving circuit includes a rectifier circuit. A first connection end of the driving circuit is electrically connected with the AC power source. An output end of the driving circuit is electrically connected with the load. A voltage of a second connection end of the driving circuit is corresponding to a voltage of the first connection end of the driving circuit. An input end of the rectifier circuit is electrically connected with the first connection end of the driving circuit. An output end of the rectifier circuit is electrically connected with the second connection end of the driving circuit. The rectifier circuit is configured to convert the first AC electric energy to a third DC electric energy. An input end of the first DC/AC converting circuit is electrically connected with the second connection end of the driving circuit. An output end of the first DC/AC converting circuit is electrically connected with a DC/AC driving element integration of the load. A first end of the switching element is electrically connected with an output end of the DC/DC converting circuit. A second end of the switching element is electrically connected with the second connection end of the driving circuit and the input end of the first DC/AC converting circuit. When the AC power source outputs power normally, the switching element is turned off, the first connection end of the driving circuit receives the first AC electric energy, the driving circuit converts the first AC electric energy to an output electric energy for driving the load, and the first DC/AC converting circuit receives the third DC electric energy through the second connection end of the driving circuit. When the power outputted from the AC power source is interrupted or abnormal, the switching element is turned on, the second connection end of the driving circuit receives the second DC electric energy through the second end of the switching element, the driving circuit converts the second DC electric energy to the output electric energy for driving the load, and the first DC/AC converting circuit receives the second DC electric energy through the output end of the DC/DC converting circuit.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 3:
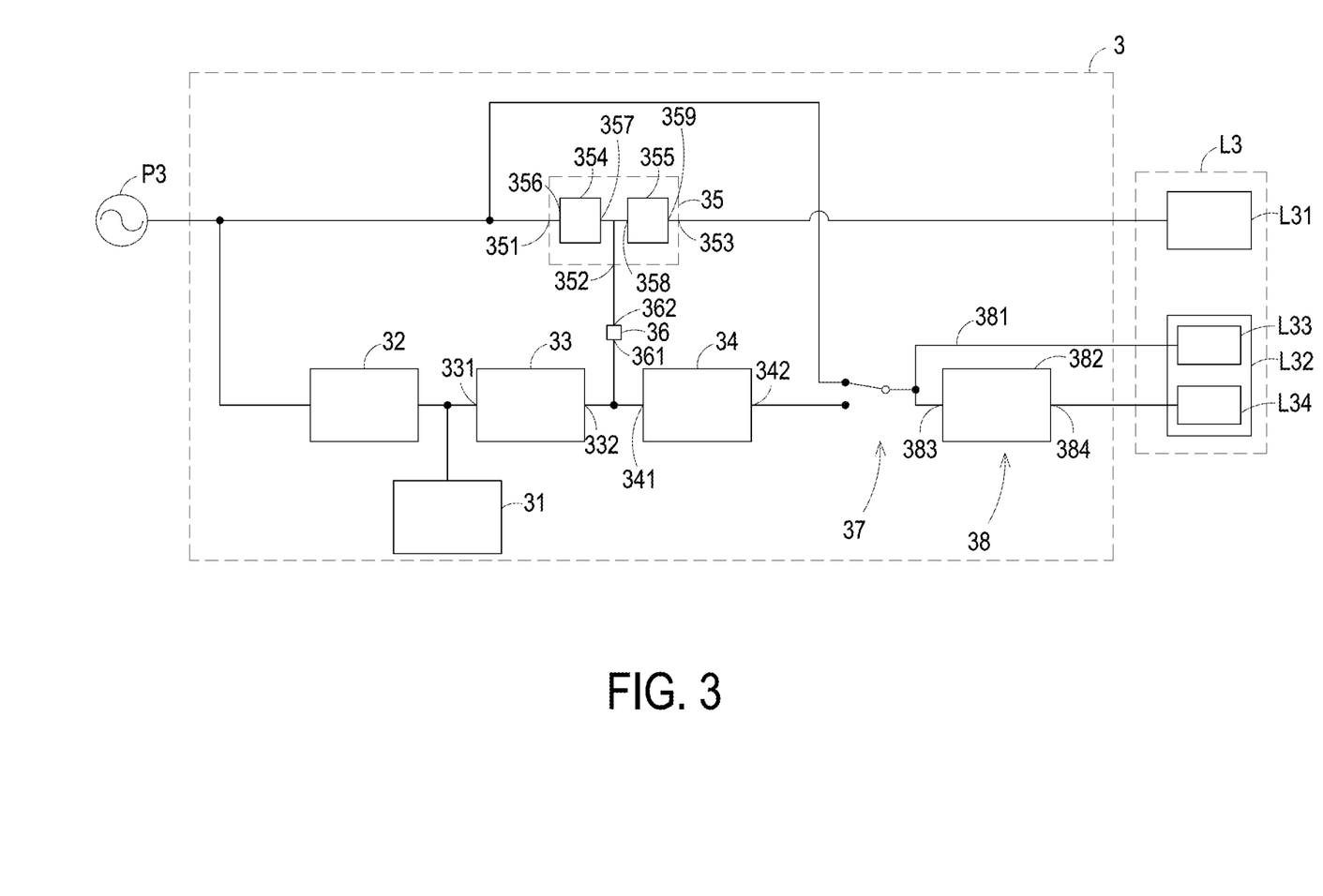
FIG. 3 is a schematic block diagram illustrating an uninterruptible power operating apparatus according to a first embodiment of the present disclosure.

FIG. 3 is a schematic block diagram illustrating an uninterruptible power operating apparatus according to a first embodiment of the present disclosure. As shown in FIG. 3, in this embodiment, one end of the uninterruptible power operating apparatus 3 is electrically connected with an AC power source P3. The AC power source P3 is, for example but not limited to, the utility power. Moreover, the other end of the uninterruptible power operating apparatus 3 is electrically connected with a load L3. The uninterruptible power operating apparatus 3 drives a motor L31 of the load L3 to work, and supplies power to a DC/AC driving element integration L32 disposed within the load L3. Preferably but not exclusively, the load L3 is an elevator. The DC/AC driving element integration L32 includes an AC driving element set L33 and a DC driving element set L34. The AC driving element set L33 includes but not limited to a control device within the elevator. The DC driving element set L34 includes but not limited to an elevator braking assembly. The uninterruptible power operating apparatus 3 includes an energy storage element such as a rechargeable battery 31, a charging circuit 32, a DC/DC converting circuit 33, a first DC/AC converting circuit 34, a driving circuit 35 and a switching element 36. For example, the switching element 36 may be a diode, a MOSFET, a Relay or any switchable circuit element.

The rechargeable battery 31 outputs a first DC electric energy when the power outputted from the AC power source P3 is interrupted or abnormal. The charging circuit 32 is electrically connected between the AC power source P3 and the rechargeable battery 31. The charging circuit 32 receives and converts the first AC electric energy outputted from the AC power source P3 to charge the rechargeable battery 31 when the AC power source P3 outputs power normally. In detail, an input end of the charging circuit 32 is electrically connected with the AC power source P3, and an output end of the charging circuit 32 is electrically connected with the rechargeable battery 31.

The DC/DC converting circuit 33 includes an input end 331 and an output end 332. The input end 331 of the DC/DC converting circuit 33 is electrically connected with the rechargeable battery 31. When the power outputted from the AC power source P3 is interrupted or abnormal, the DC/DC converting circuit 33 receives the first DC electric energy discharged from the rechargeable battery 31 through the input end 331 thereof, and then converts the first DC electric energy to a second DC electric energy, and then outputs the second DC electric energy through the output end 332 thereof.

The first DC/AC converting circuit 34 includes an input end 341 and an output end 342. The input end 341 of the first DC/AC converting circuit 34 is electrically connected with the output end 332 of the DC/DC converting circuit 33. When the power outputted from the AC power source P3 is interrupted or abnormal, the first DC/AC converting circuit 34 receives the second DC electric energy outputted from the output end 332 of the DC/DC converting circuit 33 through the input end 341 thereof, and then converts the second DC electric energy to a second AC electric energy, and then outputs the second AC electric energy through the output end 342 thereof.

The driving circuit 35 includes a first connection end 351, a second connection end 352 and an output end 353. The first connection end 351 of the driving circuit 35 is electrically connected with the AC power source P3. The output end 353 of the driving circuit 35 is electrically connected with the motor L31 of the load L3. When the AC power source P3 outputs power normally, the driving circuit 35 receives the first AC electric energy through the first connection end 351 thereof, and then converts the first AC electric energy to an output electric energy, and then outputs the output electric energy to the motor L31 of the load L3 through the output end 353 thereof so as to drive the motor L31 of the load L3. The voltage of the second connection end 352 of the driving circuit 35 is corresponding to the voltage of the first connection end 351 of the driving circuit 35. Namely, the voltage of the second connection end 352 is approximately equal to the voltage of the first connection end 351.

A first end 361 of the switching element 36 is electrically connected with the output end 332 of the DC/DC converting circuit 33. A second end 362 of the switching element 36 is electrically connected with the second connection end 352 of the driving circuit 35. The switching element 36 is turned on or turned off according to the voltage difference between the first end 361 and the second end 362 of the switching element 36. Namely, when the AC power source P3 outputs power normally, the voltage of the second connection end 352 of the driving circuit 35 is corresponding to the voltage of the first connection end 351 of the driving circuit 35. The voltage of the second end 362 of the switching element 36 is corresponding to the voltage of the first AC electric energy outputted from the AC power source P3. The voltage of the first end 361 of the switching element 36 is corresponding to the voltage of the second DC electric energy converted from the first DC electric energy discharged from the rechargeable battery 31 by the DC/DC converting circuit 33. Therefore, the voltage of the second end 362 of the switching element 36 electrically connected with the second connection end 352 of the driving circuit 35 is higher than the voltage of the first end 361 of the switching element 36. The switching element 36 is hence turned off. Meanwhile, the driving circuit 35 converts the first AC electric energy to the output electric energy and outputs the output electric energy to the motor L31 of the load L3 for driving the motor L31 of the load L3. Similarly, when the power outputted from the AC power source P3 is interrupted or abnormal, the voltage of the second end 362 of the switching element 36 electrically connected with the second connection end 352 of the driving circuit 35 is lower than the voltage of the first end 361 of the switching element 36. The switching element 36 is hence turned on. Meanwhile, the second connection end 352 of the driving circuit 35 receives the second DC electric energy outputted from the DC/DC converting circuit 33 through the second end 362 of the switching element 36. The driving circuit 35 then converts the second DC electric energy to the output electric energy, and then outputs the output electric energy to the motor L31 of the load L3 through the output end 353 thereof so as to drive the motor L31 of the load L3.

From above descriptions, the switching element 36 is electrically connected between the DC/DC converting circuit 33 and the driving circuit 35 of the uninterruptible power operating apparatus 3. When the power outputted from the AC power source P3 is interrupted or abnormal, the switching element 36 is turned on so that the second DC electric energy is transferred to the driving circuit 35. Since the switching element 36 is turned on or turned off according to the voltage difference between the first end 361 and the second end 362 of the switching element 36, the switching speed of the switching element 36 is better than that of the triple ends switch element 15 of the conventional uninterruptible power operating apparatus 1 of FIG. 1. The driving circuit 16 of the conventional uninterruptible power operating apparatus 1 switches the path and then receives the AC electric energy outputted from the DC/AC converting circuit 14 through the triple ends switch element 15 when the power outputted from the AC power source P1 is interrupted or abnormal. Compared with the conventional uninterruptible power operating apparatus 1 of FIG. 1, the driving circuit 35 of the uninterruptible power operating apparatus 3 of the present disclosure receives the second DC electric energy outputted from the DC/DC converting circuit 33 immediately to maintain the operation of the system when the power outputted from the AC power source P3 is interrupted or abnormal. Hence, the uninterruptible power operating apparatus 3 of the present disclosure drives the motor L31 of the load L3 continuously when the power outputted from the AC power source P3 is interrupted or abnormal for ensuring the safety.

Moreover, the operations of the three stage circuit including the DC/DC converting circuit 13, the DC/AC converting circuit 14 and the driving circuit 16 of the conventional uninterruptible power operating apparatus 1 may cause more energy loss during power conversion of the backup electric energy discharged from the rechargeable battery 12. Compared with the conventional uninterruptible power operating apparatus 1, the uninterruptible power operating apparatus 3 of the present disclosure only employs two stage circuit including the DC/DC converting circuit 33 and the driving circuit 35 to convert the first DC electric energy discharged from the rechargeable battery 31, and then provide the converted power to the load L3 when the rechargeable battery 31 discharges the first DC electric energy. Hence, the energy loss is relative smaller when the first DC electric energy discharged from the rechargeable battery 31 is converted. In other words, the electric energy conversion efficiency of the uninterruptible power operating apparatus 3 of the present disclosure is better. Moreover, the driving circuit 35 of the uninterruptible power operating apparatus 3 of the present disclosure receives the second DC electric energy through the DC/DC converting circuit 33 and the switching element 36 but not through the first DC/AC converting circuit 34. Hence, the electric element with lower power requirement can be employed in the first DC/AC converting circuit 34 of the uninterruptible power operating apparatus 3 of the present disclosure. Therefore, the uninterruptible power operating apparatus 3 of the present disclosure has lower cost and better efficacy.

Furthermore, the driving circuit 26 of the conventional uninterruptible power operating apparatus 2 needs to employ an additional EPS port, and the conventional uninterruptible power operating apparatus 2 has thicker wires. Therefore, the conventional uninterruptible power operating apparatus 2 costs higher. Compared with the conventional uninterruptible power operating apparatus 2, the first DC electric energy of the rechargeable battery 31 of the uninterruptible power operating apparatus 3 of the present disclosure is transferred to the driving circuit 35 after the first DC electric energy is boosted by the DC/DC converting circuit 33. The electric energy transferred from the DC/DC converting circuit 33 to the driving circuit 35 is enough for operating the driving circuit 35. Hence, the EPS port is omitted in the uninterruptible power operating apparatus 3 of the present disclosure. Moreover, because the voltage between the DC/DC converting circuit 33 and the driving circuit 35 is higher, the current conveyed through the wire is smaller. Hence, only the thinner wires are need, and the uninterruptible power operating apparatus 3 costs lower.

In some embodiments, the driving circuit 35 further includes a rectifier circuit 354 and a second DC/AC converting circuit 355. The rectifier circuit 354 includes an input end 356 and an output end 357. The input end 356 of the rectifier circuit 354 is electrically connected with the first connection end 351 of the driving circuit 35. The input end 356 of the rectifier circuit 354 receives the first AC electric energy outputted from the AC power source P3 through the first connection end 351 of the driving circuit 35. The rectifier circuit 354 rectifies the first AC electric energy to a third DC electric energy when the first connection end 351 of the driving circuit 35 receives the first AC electric energy outputted from the AC power source P3. The second DC/AC converting circuit 355 includes an input end 358 and an output end 359. The input end 358 of the second DC/AC converting circuit 355 is electrically connected with the output end 357 of the rectifier circuit 354 and the second connection end 352 of the driving circuit 35. The output end 359 of the second DC/AC converting circuit 355 is electrically connected with the output end 353 of the driving circuit 35. The input end 358 of the second DC/AC converting circuit 355 selectively receives the third DC electric energy through the output end 357 of the rectifier circuit 354, or receives the second DC electric energy through the second connection end 352 of the driving circuit 35. The second DC/AC converting circuit 355 converts the third DC electric energy or the second DC electric energy to the output electric energy, and then outputs the output electric energy to the load L3 through the output end 359 thereof.

In some embodiments, the uninterruptible power operating apparatus 3 further includes a triple ends switching element 37. According to the power supplying status of the AC power source P3, the triple ends switching element 37 selectively switches the path to be between the AC power source P3 and the DC/AC driving element integration L32 of the load L3, or the path between the output end 342 of the first DC/AC converting circuit 34 and the DC/AC driving element integration L32 of the load L3. When the AC power source P3 outputs power normally, the triple ends switching element 37 is switched to be electrically connected between the AC power source P3 and the DC/AC driving element integration L32 of the load L3. Under this circumstance, the first AC electric energy outputted from the AC power source P3 is transferred to the DC/AC driving element integration L32 of the load L3 through the triple ends switching element 37. When the power outputted from the AC power source P3 is interrupted or abnormal, the triple ends switching element 37 is switched to be electrically connected between the output end 342 of the first DC/AC converting circuit 34 and the DC/AC driving element integration L32 of the load L3. Under this circumstance, the second AC electric energy outputted from the output end 342 of the first DC/AC converting circuit 34 is transferred to the DC/AC driving element integration L32 of the load L3 through the triple ends switching element 37.

In some embodiments, the uninterruptible power operating apparatus 3 further includes an output module 38. The output module 38 is electrically connected between the triple ends switching element 37 and the DC/AC driving element integration L32 of the load L3. The output module 38 includes an AC output end 381 and a power supply unit 382. The AC output end 381 of the output module 38 is electrically connected between the triple ends switching element 37 and the AC driving element set L33 of the DC/AC driving element integration L32 of the load L3. When the AC power source P3 outputs power normally, the AC output end 381 receives the first AC electric energy outputted from the AC power source P3, and then transfers the first AC electric energy to the AC driving element set L33 of the DC/AC driving element integration L32 of the load L3. When the power outputted from the AC power source P3 is interrupted or abnormal, the AC output end 381 receives the second AC electric energy outputted from the output end 342 of the first DC/AC converting circuit 34 and transfers the second AC electric energy to the AC driving element set L33 of the DC/AC driving element integration L32 of the load L3. The power supply unit 382 of the output module 38 is electrically connected between the triple ends switching element 37 and the DC driving element set L34 of the DC/AC driving element integration L32 of the load L3. When the AC power source P3 outputs power normally, the power supply unit 382 receives the first AC electric energy through an input end 383 thereof, and then converts the first AC electric energy to a fourth DC electric energy, and then transfers the fourth DC electric energy to the DC driving element set L34 of the DC/AC driving element integration L32 of the load L3 through an output end 384 thereof. When the power outputted from the AC power source P3 is interrupted or abnormal, the power supply unit 382 receives the second AC electric energy through the input end 383 thereof, and then converts the second AC electric energy to the fourth DC electric energy, and then transfers the fourth DC electric energy to the DC driving element set L34 of the DC/AC driving element integration L32 of the load L3 through the output end 384 thereof.

In some embodiments, the first DC electric energy discharged from the rechargeable battery 31 of the uninterruptible power operating apparatus 3 of the present disclosure is converted, and then the voltage of the first DC electric energy is boosted by the DC/DC converting circuit 33, and then transferred to the driving circuit 35. Hence, a battery with lower voltage, such as lead-acid battery, can be employed in the rechargeable battery 31.

Certainly, the input end of the charging circuit 32 is not limited to be electrically connected with the AC power source P3 as shown in FIG. 3. Please refer to FIG. 4, which is a schematic block diagram illustrating an uninterruptible power operating apparatus according to a second embodiment of the present disclosure. In comparison with the connection of the input end of the charging circuit 32 of FIG. 3, the input end of the charging circuit 32 of this embodiment is electrically connected with the second connection end 352 of the driving circuit 35. When the AC power source P3 outputs power normally, the driving circuit 35 transfers the first AC electric energy to the charging circuit 32 through the second connection end 352 thereof. The input end of the charging circuit 32 is electrically connected between the second connection end 352 of the driving circuit 35 and the second end 362 of the switching element 36. Similarly, when the AC power source P3 outputs power normally, the voltage of the second connection end 352 of the driving circuit 35 is corresponding to the voltage of the first connection end 351 of the driving circuit 35. The voltage of the second end 362 of the switching element 36 electrically connected with the second connection end 352 of the driving circuit 35 is higher than the voltage of the first end 361 of the switching element 36. Hence, the switching element 36 is turned off. When the power outputted from the AC power source P3 is interrupted or abnormal, the voltage of the second end 362 of the switching element 36 electrically connected with the second connection end 352 of the driving circuit 35 is lower than the voltage of the first end 361 of the switching element 36. Hence, the switching element 36 is turned on. The other operation ways of the system are not redundantly described herein.

Figure 5:
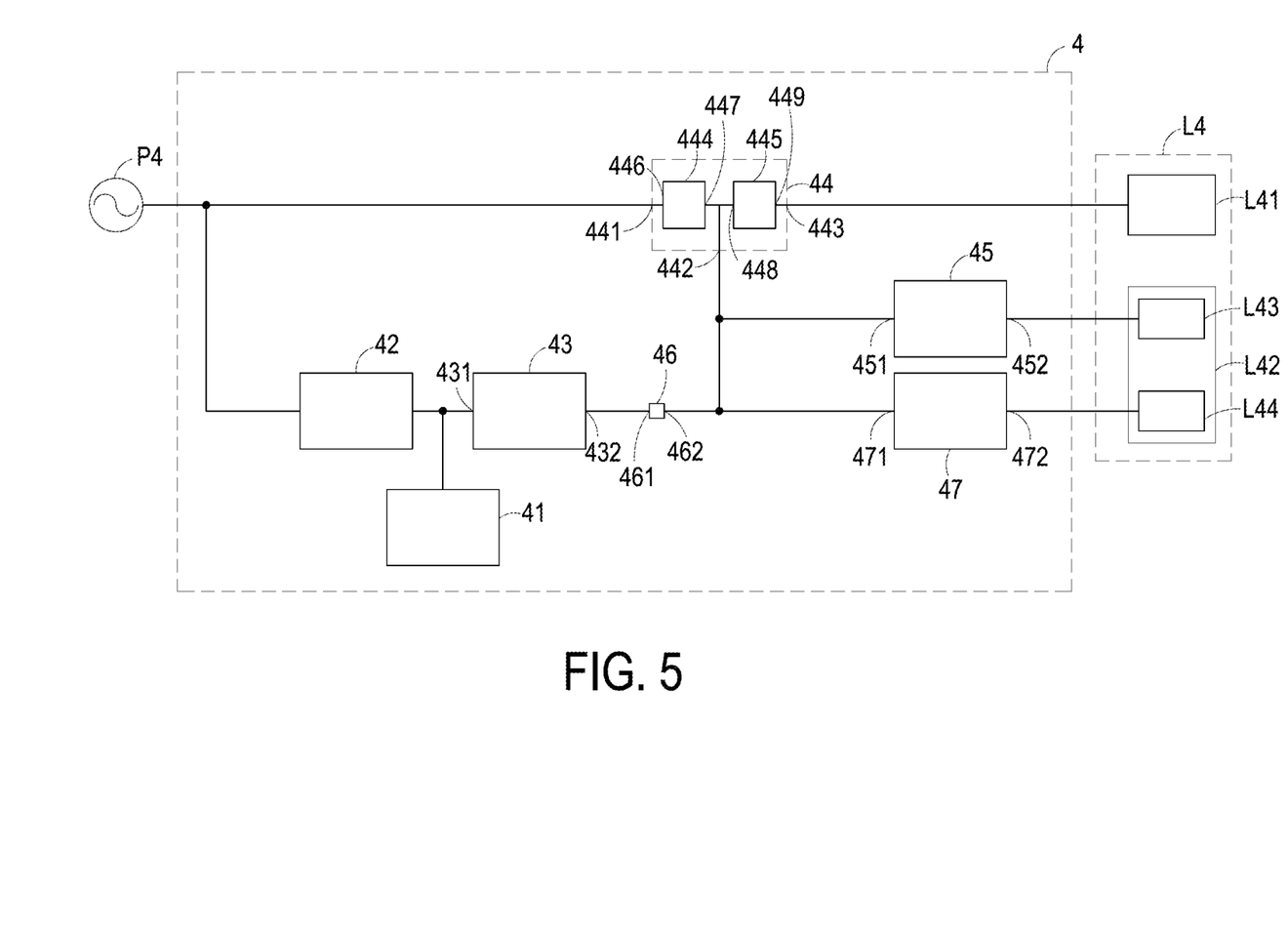
FIG. 5 is a schematic block diagram illustrating an uninterruptible power operating apparatus according to a third embodiment of the present disclosure.

FIG. 5 is a schematic block diagram illustrating an uninterruptible power operating apparatus according to a third embodiment of the present disclosure. As shown in FIG. 5, one end of the uninterruptible power operating apparatus 4 is electrically connected with an AC power source P4. When the AC power source P4 outputs power normally, the AC power source P4 outputs a first AC electric energy to the uninterruptible power operating apparatus 4. When the power outputted from the AC power source P4 is interrupted or abnormal, the AC power source P4 fails to output the electric energy to the uninterruptible power operating apparatus 4 continuously. The AC power source P4 is for example but not limited to the utility power. Moreover, the other end of the uninterruptible power operating apparatus 4 is electrically connected with a load L4. The uninterruptible power operating apparatus 4 drives a motor L41 of the load L4 to operate. The uninterruptible power operating apparatus 4 supplies power to a DC/AC driving element integration L42 disposed within the load L4. Preferably but not exclusively, the load L4 is an elevator. The DC/AC driving element integration L42 includes an AC driving element set L43 and a DC driving element set L44. The AC driving element set L43 is but not limited to a control device within the elevator. The DC driving element set L44 is but not limited to an elevator braking assembly. The uninterruptible power operating apparatus 4 includes an energy storage element such as a rechargeable battery 41, a charging circuit 42, a DC/DC converting circuit 43, a driving circuit 44, a first DC/AC converting circuit 45 and a switching element 46. For example, the switching element 46 may be a diode, a MOSFET, a Relay or any switchable circuit element.

The rechargeable battery 41 discharges a first DC electric energy when the power outputted from the AC power source P4 is interrupted or abnormal. The charging circuit 42 is electrically connected between the AC power source P4 and the rechargeable battery 41. The charging circuit 42 receives and converts the first AC electric energy outputted from the AC power source P4 to charge the rechargeable battery 41 when the AC power source P4 outputs power normally. In detail, the input end of the charging circuit 42 is electrically connected with the AC power source P4, and the output end of the charging circuit 42 is electrically connected with the rechargeable battery 41.

The DC/DC converting circuit 43 includes an input end 431 and an output end 432. The input end 431 of the DC/DC converting circuit 43 is electrically connected with the rechargeable battery 41. When the power outputted from the AC power source P4 is interrupted or abnormal, the DC/DC converting circuit 43 receives the first DC electric energy discharged from the rechargeable battery 41 through the input end 431 thereof, and then converts the first DC electric energy to a second DC electric energy, and then outputs the second DC electric energy through the output end 432 thereof.

The driving circuit 44 includes a first connection end 441, a second connection end 442 and an output end 443. The first connection end 441 of the driving circuit 44 is electrically connected with the AC power source P4. The output end 443 of the driving circuit 44 is electrically connected with the motor L41 of the load L4. When the AC power source P4 outputs power normally, the driving circuit 44 receives the first AC electric energy through the first connection end 441 thereof, and then converts the first AC electric energy to an output electric energy, and then outputs the output electric energy to the motor L41 of the load L4 through the output end 443 thereof so as to drive the motor L41 of the load L4. The voltage of the second connection end 442 of the driving circuit 44 is corresponding to the voltage of the first connection end 441 of the driving circuit 44. Namely, the voltage of the second connection end 442 is approximately equal to the voltage of the first connect end 441.

The first DC/AC converting circuit 45 includes an input end 451 and an output end 452. The input end 451 of the first DC/AC converting circuit 45 is electrically connected with the second connection end 442 of the driving circuit 44. The output end 452 of the first DC/AC converting circuit 45 is electrically connected with the AC driving element set L43 of the DC/AC driving element integration L42 of the load L4. When the AC power source P4 outputs power normally, the input end 451 of the first DC/AC converting circuit 45 receives the first AC electric energy outputted from the AC power source P4 through the second connection end 442 of the driving circuit 44. The first AC electric energy is rectified to the output electric energy by the driving circuit 44. The output end 452 of the first DC/AC converting circuit 45 outputs the output electric energy to the AC driving element set L43 of the DC/AC driving element integration L42 of the Load L4.

A first end 461 of the switching element 46 is electrically connected with the output end 432 of the DC/DC converting circuit 43. A second end 462 of the switching element 46 is electrically connected with the second connection end 442 of the driving circuit 44 and the input end 451 of the first DC/AC converting circuit 45. The switching element 46 is turned on or turned off according to the voltage difference between the first end 461 and the second end 462 of the switching element 46. When the AC power source P4 outputs power normally, the voltage of the second connection end 442 of the driving circuit 44 is corresponding to the voltage of the first connection end 441 of the driving circuit 44. The voltage of the second end 462 of the switching element 46 is corresponding to the voltage of the first AC electric energy of the AC power source P4. The voltage of the first end 461 of the switching element 46 is corresponding to the voltage of the second DC electric energy converted from the first DC electric energy of the rechargeable battery 41 by the DC/DC converting circuit 43. The voltage of the second end 462 of the switching element 46 electrically connected with the second connection end 442 of the driving circuit 44 is higher than the voltage of the first end 461 of the switching element 46. The switching element 46 is hence turned off. The driving circuit 44 converts the first AC electric energy to the output electric energy, and outputs the output electric energy to the motor L41 of the load L4 for driving the motor L41 of the load L4. Similarly, when the power outputted form the AC power source P4 is interrupted or abnormal, the voltage of the second end 462 of the switching element 46 electrically connected with the second connection end 442 of the driving circuit 44 is lower than the voltage of the first end 461 of the switching element 46. The switching element 46 is hence turned on. The second connection end 442 of the driving circuit 44 receives the second DC electric energy outputted from the DC/DC converting circuit 43 through the second end 462 of the switching element 46. The driving circuit 44 then converts the second DC electric energy to the output electric energy. The output end 443 of the driving circuit 44 then outputs the output electric energy to the motor L41 of the load L4 for driving the motor L41 of the load L4.

In some embodiments, the driving circuit 44 further includes a rectifier circuit 444 and a second DC/AC converting circuit 445. The rectifier circuit 444 includes an input end 446 and an output end 447. The input end 446 of the rectifier circuit 444 is electrically connected with the first connection end 441 of the driving circuit 44. The input end 446 of the rectifier circuit 444 receives the first AC electric energy outputted from the AC power source P4 through the first connection end 441 of the driving circuit 44. The rectifier circuit 444 rectifies the first AC electric energy to a third DC electric energy when the first connection end 441 of the driving circuit 44 receives the first AC electric energy outputted from the AC power source P4.

The second DC/AC converting circuit 445 includes an input end 448 and an output end 449. The input end 448 of the second DC/AC converting circuit 445 is electrically connected with the output end 447 of the rectifier circuit 444 and the second connection end 442 of the driving circuit 44.

The output end 449 of the second DC/AC converting circuit 445 is electrically connected with the output end 443 of the driving circuit 44. The input end 448 of the second DC/AC converting circuit 445 selectively receives the third DC electric energy through the output end 447 of the rectifier circuit 444, or receives the second DC electric energy through the second connection end 442 of the driving circuit 44. The second DC/AC converting circuit 445 converts the third DC electric energy or the second DC electric energy to the output electric energy, and then outputs the output electric energy to the load L4 through the output end 449 thereof.

Moreover, the first DC/AC converting circuit 45 receives the third DC electric energy through the output end 447 of the rectifier circuit 444, or receives the second DC electric energy through the second end 462 of the switching element 46. The first DC/AC converting circuit 45 converts the third DC electric energy or the second DC electric energy to a second AC electric energy, and then outputs the second AC electric energy to the DC/AC driving element integration L42 of the load L4.

In some embodiments, the uninterruptible power operating apparatus 4 further includes a power supply unit 47. The power supply unit 47 includes an input end 471 and an output end 472. The input end 471 of the power supply unit 47 is electrically connected with the second connection end 442 of the driving circuit 44 and the second end 462 of the switching element 46. The output end 472 of the power supply unit 47 is electrically connected with the DC driving element set L44 of the DC/AC driving element integration L42 of the load L4. When the AC power source P4 outputs power normally, the power supply unit 47 receives the third DC electric energy outputted from the rectifier circuit 444 through the input end 471 thereof, and then converts the third DC electric energy to a fourth DC electric energy, and then outputs the fourth electric energy through the output end 472 thereof. When the power outputted from the AC power source P4 is interrupted or abnormal, the input end 472 of the power supply unit 47 receives the second DC electric energy outputted from the output end 432 of the DC/DC converting circuit 43 through the second end 462 of the switching element 46. The power supply unit 47 then converts the second DC electric energy to the fourth DC electric energy, and then outputs the fourth electric energy through the output end 472 thereof.

In some embodiments, the first DC electric energy discharged from the rechargeable battery 41 of the uninterruptible power operating apparatus 4 of the present disclosure is converted, and the voltage of the first DC electric energy is boosted through the DC/DC converting circuit 43, and then transferred to the driving circuit 44. Hence, the battery with lower voltage, such as lead-acid battery, can be employed in the rechargeable battery 41.

Certainly, the input end of the charging circuit 42 is not limited to be electrically connected with the AC power source P4 as shown in FIG. 5. Please refer to FIG. 6, which is a schematic block diagram illustrating an uninterruptible power operating apparatus according to a fourth embodiment of the present disclosure. In comparison with the connection of the input end of the charging circuit 42 of FIG. 5, the input end of the charging circuit 42 of this embodiment is electrically connected with the second connection end 442 of the driving circuit 44. When the AC power source P4 outputs power normally, the driving circuit 44 transfers the first AC electric energy to the charging circuit 42 through the second connection end 442 thereof. The input end of the charging circuit 42 is electrically connected between the second connection end 442 of the driving circuit 44 and the second end 462 of the switching element 46. Similarly, when the AC power source P4 outputs power normally, the voltage of the second connection end 442 of the driving circuit 44 is corresponding to the voltage of the first connection end 441 of the driving circuit 44. The voltage of the second end 462 of the switching element 46 electrically connected with the second connection end 442 of the driving circuit 44 is higher than the voltage of the first end 461 of the switching element 46. Hence, the switching element 46 is turned off. When the power outputted form the AC power source P4 is interrupted or abnormal, the voltage of the second end 462 of the switching element 46 electrically connected with the second connection end 442 of the driving circuit 44 is lower than the voltage of the first end 461 of the switching element 46. Hence, the switching element 46 is turned on. The other operation ways of the system are not redundantly described herein.

Figure 4:
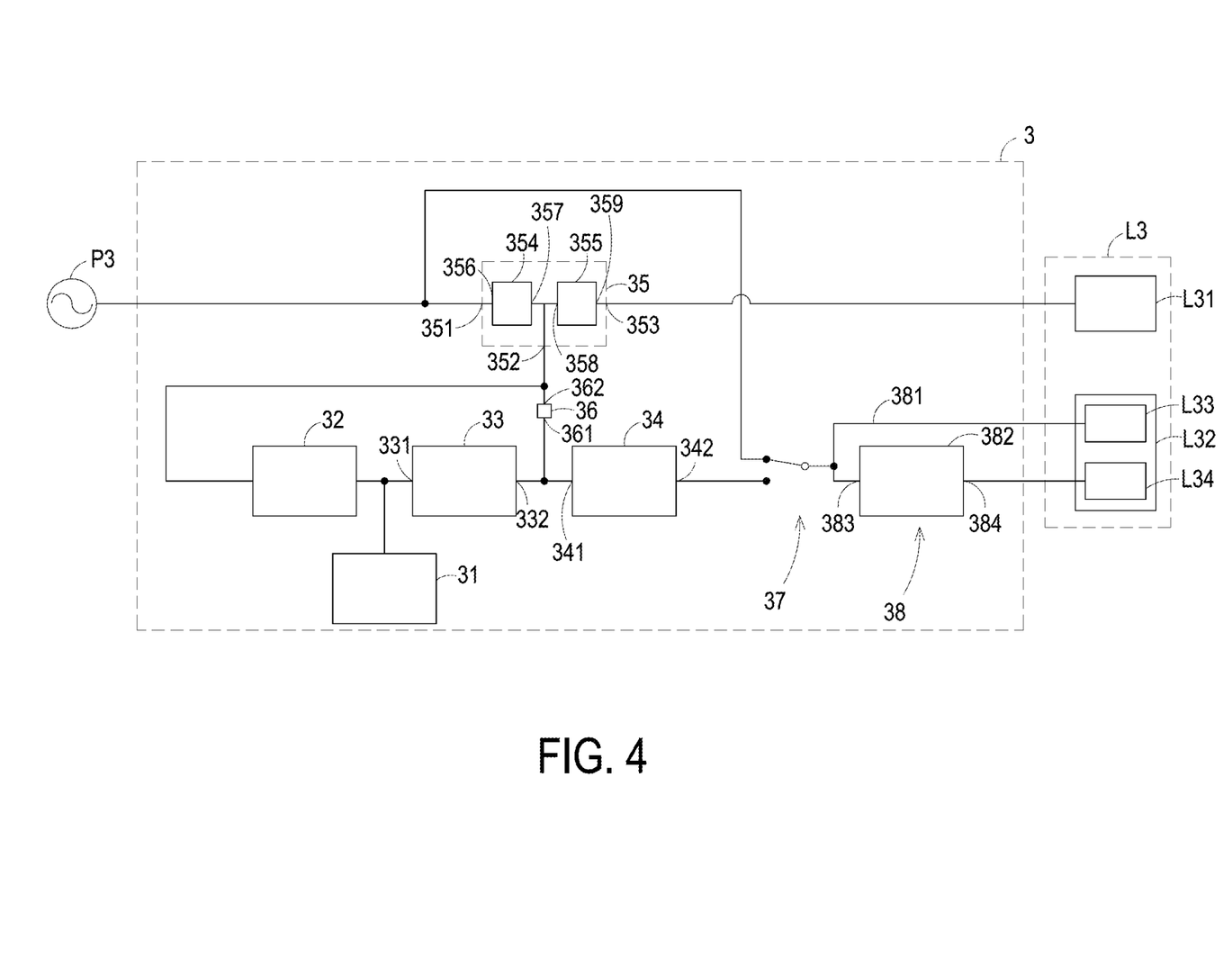
FIG. 4 is a schematic block diagram illustrating an uninterruptible power operating apparatus according to a second embodiment of the present disclosure.
Figure 6:
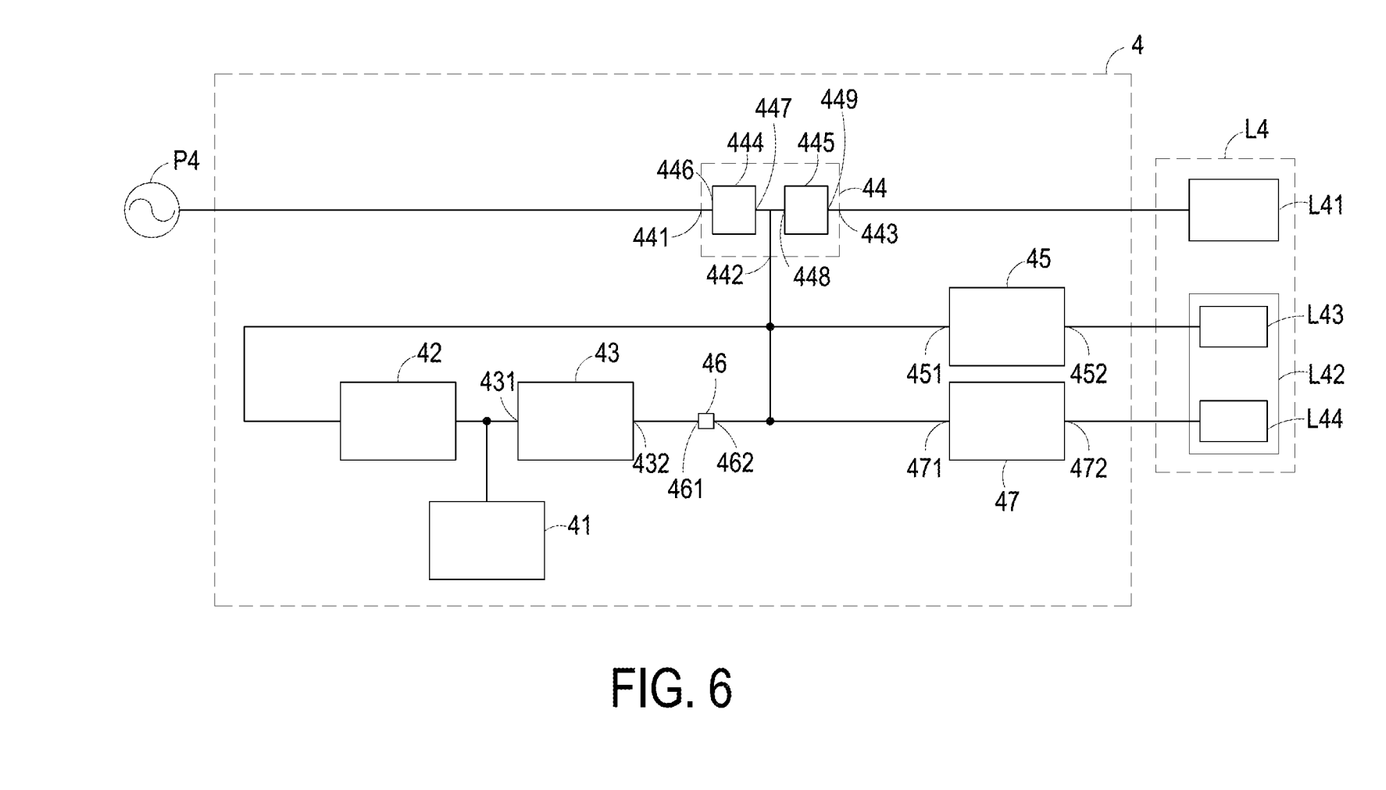
FIG. 6 is a schematic block diagram illustrating an uninterruptible power operating apparatus according to a fourth embodiment of the present disclosure.

Moreover, the structures and operations of the uninterruptible power operating apparatus 4 of FIGS. 5 and 6 are similar to the uninterruptible power operating apparatus 3 of FIGS. 3 and 4. Therefore, the advantages of the uninterruptible power operating apparatus 4 of FIGS. 5 and 6 are similar to the uninterruptible power operating apparatus 3 of FIGS. 3 and 4, and are not redundantly described herein.

As mentioned above, the switching element is electrically connected between the DC/DC converting circuit and the driving circuit of the uninterruptible power operating apparatus of the present disclosure. When the power outputted from the AC power source is interrupted or abnormal, the switching element is turned on or turned off according to the voltage difference between the first end and the second end of the switching element. Hence, the switching element transfers the second DC electric energy to the driving circuit rapidly according to the switching operation of the switching element. Hence, when the power outputted from the AC power source is interrupted or abnormal, the driving circuit of the uninterruptible power operating apparatus of the present disclosure receives the second DC electric energy outputted from the DC/DC converting circuit immediately to drive the motor of the load continuously for ensuring the safety. Moreover, the operation of the three stage circuit of the conventional uninterruptible power operating apparatus may cause energy loss during the power conversion of the backup electric energy discharged from the rechargeable battery. Compared with the conventional uninterruptible power operating apparatus, the uninterruptible power operating apparatus of the present disclosure only employs two stage circuit including the DC/DC converting circuit and the driving circuit to convert the backup electric energy and provide the converted power to the load. Hence, the energy loss is smaller when the first DC electric energy discharged from the rechargeable battery is converted. In other words, the energy conversion efficiency of the uninterruptible power operating apparatus of the present disclosure is better.

Furthermore, the first DC electric energy discharged from the rechargeable battery of the uninterruptible power operating apparatus of the present disclosure is boosted through the DC/DC converting circuit and then transferred to the driving circuit. The electric energy transferred from the DC/DC converting circuit to the driving circuit is enough to drive the driving circuit to operate. Hence, the additional EPS port of conventional art is omitted in the uninterruptible power operating apparatus of the present disclosure. Moreover, because the current conveyed through the wire between the DC/DC converting circuit and the driving circuit is smaller, the thinner wire is used. Hence, the uninterruptible power operating apparatus costs lower.

While the disclosure has been described in terms of what is presently considered to be the most practical and preferred embodiments, it is to be understood that the disclosure needs not be limited to the disclosed embodiment.

What is claimed is:

1. An uninterruptible power operating apparatus electrically connected between an AC power source and a load, and receiving a first AC electric energy outputted from the AC power source, the uninterruptible power operating apparatus comprising:
   an energy storage element configured to provide a first DC electric energy;
   a charging circuit configured to receive and convert the first AC electric energy to charge the energy storage element when the AC power source outputs power normally;
   a DC/DC converting circuit having an input end and an output end, wherein the DC/DC converting circuit is electrically connected with the energy storage element through the input end thereof, and configured to convert the first DC electric energy to a second DC electric energy when the power outputted from the AC power source is interrupted or abnormal;
   a first DC/AC converting circuit having an input end, wherein the first DC/AC converting circuit is electrically connected with the output end of the DC/DC converting circuit through the input end thereof, and configured to convert the second DC electric energy to a second AC electric energy;
   a driving circuit having a first connection end, a second connection end and an output end, wherein the driving circuit is electrically connected with the AC power source through the first connection end thereof, and electrically connected with the load through the output end thereof, and a voltage of the second connection end thereof is corresponding to a voltage of the first connection end thereof; and
   a switching element having a first end and a second end, wherein the switching element is electrically connected with the output end of the DC/DC converting circuit through the first end thereof, and electrically connected with the second connection end of the driving circuit through the second end thereof,
   wherein when the AC power source outputs power normally, the switching element is turned off, and the driving circuit receives the first AC electric energy through the first connection end thereof, and converts the first AC electric energy to an output electric energy for driving the load, and
   wherein when the power outputted from the AC power source is interrupted or abnormal, the switching element is turned on, and the driving circuit receives the second DC electric energy through the second connection end thereof and the second end of the switching element, and converts the second DC electric energy to the output electric energy for driving the load.

2. The uninterruptible power operating apparatus according to claim 1, wherein the charging circuit is electrically connected between the AC power source and the energy storage element.

3. The uninterruptible power operating apparatus according to claim 1, wherein the driving circuit comprises a rectifier circuit having an input end, wherein the rectifier circuit is electrically connected with the first connection end of the driving circuit through the input end thereof, and configured to rectify the first AC electric energy to a third DC electric energy.

4. The uninterruptible power operating apparatus according to claim 3, wherein the driving circuit further comprises a second DC/AC converting circuit having an input end and an output end, wherein the second DC/AC converting circuit is electrically connected with an output end of the rectifier circuit and the second connection end of the driving circuit through the input end thereof, and electrically connected with the output end of the driving circuit through the output end thereof, and configured to convert the third DC electric energy or the second DC electric energy to the output electric energy.

5. The uninterruptible power operating apparatus according to claim 1, further comprising a triple ends switching element, wherein the triple ends switching element is configured to selectively switch the path between the AC power source and a DC/AC driving element integration of the load, or the path between the output end of the first DC/AC converting circuit and the DC/AC driving element integration of the load.

6. The uninterruptible power operating apparatus according to claim 5, further comprising an output module, wherein an AC output end of the output module is electrically connected between the triple ends switching element and the DC/AC driving element integration of the load, and configured to transfer the first AC electric energy or the second AC electric energy received by the triple ends switching element to the DC/AC driving element integration of the load.

7. The uninterruptible power operating apparatus according to claim 6, wherein the output module further comprises a power supply unit electrically connected between the triple ends switching element and the DC/AC driving element integration of the load, wherein the power supply unit is configured to receive the first AC electric energy or the second AC electric energy through the triple ends switching element, and to convert the first AC electric energy or the second AC electric energy to a fourth DC electric energy.

8. The uninterruptible power operating apparatus according to claim 1, wherein the energy storage element is a lead-acid battery.

9. The uninterruptible power operating apparatus according to claim 1, wherein the charging circuit is electrically connected between the energy storage element and the second connection end of the driving circuit.

10. The uninterruptible power operating apparatus according to claim 9, wherein an input end of the charging circuit is electrically connected between the second connection end of the driving circuit and the second end of the switching element, and an output end of the charging circuit is electrically connected with the energy storage element.

11. The uninterruptible power operating apparatus according to claim 1, wherein the load comprises a motor.

12. The uninterruptible power operating apparatus according to claim 1, wherein the switching element includes a diode, a MOSFET, a Relay or a switchable circuit element.

13. An uninterruptible power operating apparatus electrically connected between an AC power source and a load, and receiving a first AC electric energy outputted from the AC power source, the uninterruptible power operating apparatus comprising:
   an energy storage element configured to provide a first DC electric energy;

a charging circuit configured to receive and convert the first AC electric energy to charge the energy storage element when the AC power source outputs power normally;

a DC/DC converting circuit having an input end and an output end, wherein the DC/DC converting circuit is electrically connected with the energy storage element through the input end thereof, and configured to convert the first DC electric energy to a second DC electric energy when the power outputted from the AC power source is interrupted or abnormal;

a driving circuit comprising a rectifier circuit, a first connection end, a second connection end and an output end, wherein the driving circuit is electrically connected with the AC power source through the first connection end thereof, and electrically connected with the load through the output end thereof, wherein a voltage of the second connection end thereof is corresponding to a voltage of the first connection end thereof, wherein an input end of the rectifier circuit is electrically connected with the first connection end of the driving circuit, an output end of the rectifier circuit is electrically connected with the second connection end of the driving circuit, and the rectifier circuit is configured to convert the first AC electric energy to a third DC electric energy;

a first DC/AC converting circuit having an input end and an output end, wherein the first DC/AC converting circuit is electrically connected with the second connection end of the driving circuit through the input end thereof, and electrically connected with a DC/AC driving element integration of the load through the output end thereof; and a switching element having a first end and a second end, wherein the switching element is electrically connected with the output end of the DC/DC converting circuit with the first end thereof, and electrically connected with the second connection end of the driving circuit and the input end of the first DC/AC converting circuit with the second end thereof, wherein when the AC power source outputs power normally, the switching element is turned off, the first connection end of the driving circuit receives the first AC electric energy, the driving circuit converts the first AC electric energy to an output electric energy for driving the load, and the first DC/AC converting circuit receives the third DC electric energy through the second connection end of the driving circuit, and wherein when the power outputted from the AC power source is interrupted or abnormal, the switching element is turned on, the second connection end of the driving circuit receives the second DC electric energy through the second end of the switching element, the driving circuit converts the second DC electric energy to the output electric energy for driving the load, and the first DC/AC converting circuit receives the second DC electric energy through the output end of the DC/DC converting circuit.

14. The uninterruptible power operating apparatus according to claim 13, wherein the charging circuit is electrically connected between the AC power source and the energy storage element.

15. The uninterruptible power operating apparatus according to claim 13, wherein the driving circuit further comprises a second DC/AC converting circuit having an input end and an output end, wherein the second DC/AC converting circuit is electrically connected with the output end of the rectifier circuit and the second end of the switching element with the input end thereof, and electrically connected with the load with the output end thereof, and configured to convert the third DC electric energy or the second DC electric energy to the output electric energy.

16. The uninterruptible power operating apparatus according to claim 13, wherein the first DC/AC converting circuit is configured to convert the third DC electric energy or the second DC electric energy to a second AC electric energy, and to output the second AC electric energy to the DC/AC driving element integration of the load.

17. The uninterruptible power operating apparatus according to claim 13, further comprising a power supply unit having an input end and an output end, wherein the power supply unit is electrically connected with the second connection end of the driving circuit and the second end of the switching element with the input end thereof, and electrically connected with the DC/AC driving element integration of the load with the output end thereof, and configured to receive and convert the third DC electric energy or the second DC electric energy to a fourth DC electric energy, and to output the fourth DC electric energy to the DC/AC driving element integration of the load.

18. The uninterruptible power operating apparatus according to claim 13, wherein the energy storage element is a lead-acid battery.

19. The uninterruptible power operating apparatus according to claim 13, wherein the charging circuit is electrically connected between the energy storage element and the second connection end of the driving circuit.

20. The uninterruptible power operating apparatus according to claim 19, wherein an input end of the charging circuit is electrically connected between the second connection end of the driving circuit and the second end of the switching element, and an output end of the charging circuit is electrically connected with the energy storage element.

21. The uninterruptible power operating apparatus according to claim 13, wherein the switching element includes a diode, a MOSFET, a Relay or a switchable circuit element.

* * * * *